United States Patent [19]
Gregory

[11] 3,905,195
[45] Sept. 16, 1975

[54] POWER PLANT

[76] Inventor: Alvin L. Gregory, 5860 Callister Ave., Sacramento, Calif. 95819

[22] Filed: June 5, 1972

[21] Appl. No.: 259,557

Related U.S. Application Data

[62] Division of Ser. No. 186,092, Oct. 4, 1971, Pat. No. 3,787,140.

[52] U.S. Cl. .................................................. 60/512
[51] Int. Cl. ............................................ F01b 29/12
[58] Field of Search ............................. 60/508–515

[56] References Cited
UNITED STATES PATENTS

| | | | |
|---|---|---|---|
| 1,317,401 | 9/1919 | Struever | 60/27 |
| 2,839,888 | 6/1958 | Mallory | 60/27 X |
| 2,867,975 | 1/1959 | Mallory | 60/514 |
| 3,161,572 | 12/1964 | Kagi | 60/108 R |
| 3,224,187 | 12/1965 | Breihan | 60/26 X |
| 3,695,036 | 1/1970 | Martin, Sr. | 60/27 |

FOREIGN PATENTS OR APPLICATIONS

| 1,008,680 | 4/1902 | France | 60/27 |
|---|---|---|---|

Primary Examiner—Martin P. Schwadron
Assistant Examiner—Allen M. Ostrager
Attorney, Agent, or Firm—Edwin E. Greigg

[57] ABSTRACT

A prime source of mechanical power comprising an expansion chamber, an inlet into which expansible fluid is injected, and an outlet through which the fluid is exhausted after expansion in chamber. Expansion of fluid is achieved by application of a heat source directly to the expansion chamber, which expansion acts through a piston to create useful mechanical motion. The prime source of mechanical power preferably includes an expansion chamber having three laterally adjacent portions, with one portion receiving the fluid for heating purposes, another portion having the piston mounted therein, and the third portion being situated between the other two portions and serving to provide a reduced flow path therebetween for the gas resulting from heating the fluid.

9 Claims, 8 Drawing Figures

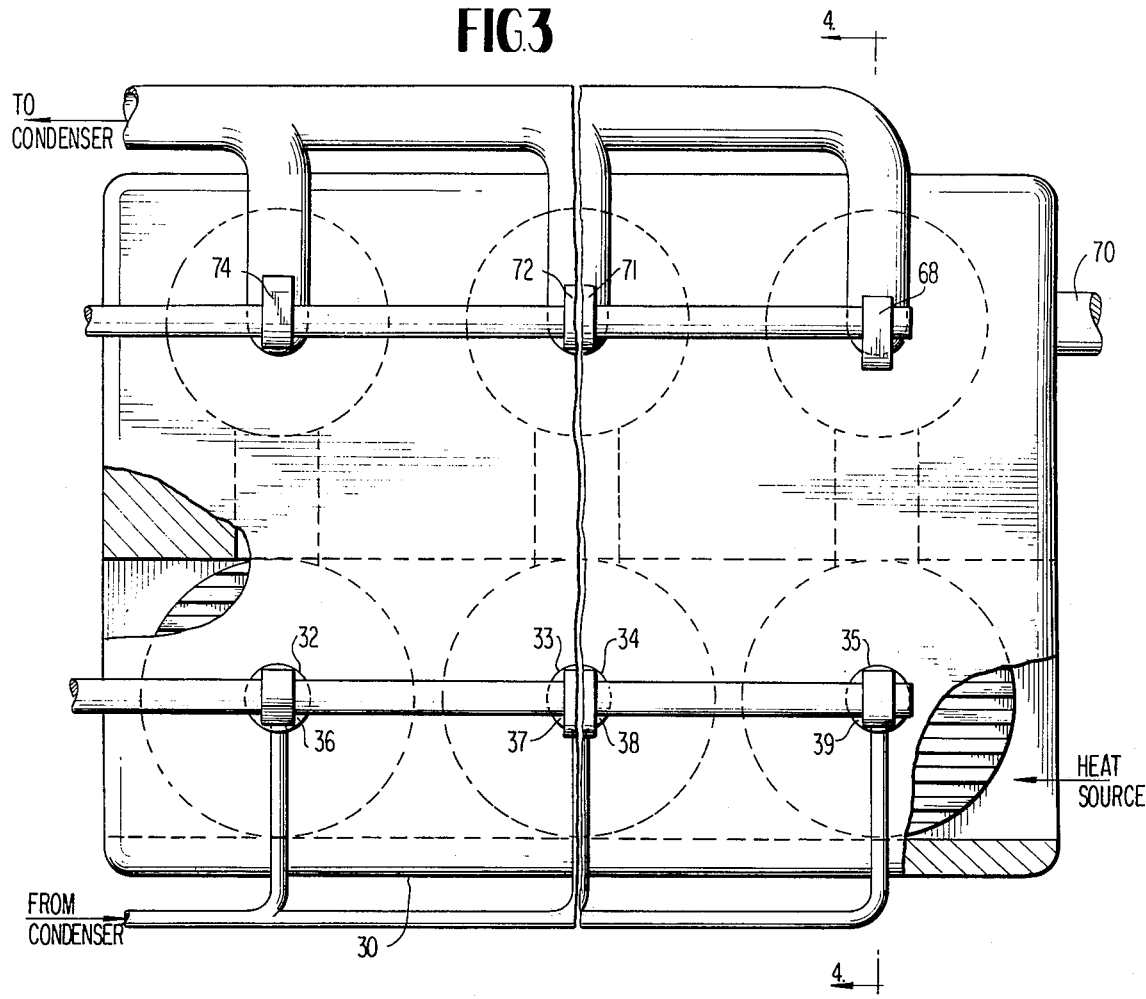

INVENTOR
ALVIN L. GREGORY

BY

ATTORNEY

POWER PLANT

This is a division of application Ser. No. 186,092, filed Oct. 6, 1971 now U.S. Pat. No. 3,787,140.

This invention relates to a system in which heat energy is converted into mechanical energy and, more particularly, to a concept wherein the heat source is applied directly to the power plant to achieve mechanical power therefrom.

BACKGROUND OF THE INVENTION

It is well known in some power plants to use an external boiler as a separate component and when a heat source is applied thereto, the expansion fluid, such as steam, which is created in the boiler, is transmitted to the power plant in order to derive mechanical power therefrom.

One of the principal reasons the steam engine, as applied to the motor vehicle, was never completely successful was because of the safety hazards involved since boilers are likely to explode causing bodily harm and vast destruction. Moreover, external boilers of the design known heretofore require a large mass of fluid separate from the engine which also contains a certain amount of fluid and thus the boiler, together with its heat source, is sizable, and then to this must be added en masse the weight of the power plant, all of which factors must be taken into consideration and eliminated where possible.

OBJECTS OF THE INVENTION

Accordingly, the principal object of the invention is to apply a heat source to an engine which may be of a conventional expansion chamber type including a reciprocating piston, a turbine or a rotary motor.

Another object of the invention is to provide an engine construction wherein an injector valve will inject a definite quantity of fluid under pressure to the expansion chamber of the engine during which time the heat source will not only heat the injector valve, but also the engine and will expand the injected fluid to a high volume to drive the piston and perform the work intended.

Still another object of the invention is to provide a system of turbine operation which utilizes the principles narrated relative to a reciprocating type engine, but which also has the versatility of operation in which the flow of a fluid from the injector to the engine can travel from the stator to the rotor or vice versa to achieve power from the turbine engine.

A still further object of the invention is to provide a new system of producing power which is not only lighter in weight, but much more compact and thus suitable for producing power in less space than that now required from normal conventional type boiler construction.

A still further object of the invention is to provide an engine design in which, on the one hand, the heat source is applied directly to the engine as the fluid is being injected into the expansion chamber thereof or, on the other hand, to an expansion chamber having three portions positioned adjacent to each other with the reciprocating piston being mounted in one portion and with the fluid being heated in another portion and by reason of which the applied heat causes sublimation to drive the piston.

Yet another object of the invention is to provide a turbine construction wherein the fluid traverses a tortuous path through a duct system extending longitudinally between the juxtaposed surfaces of a stator and a rotor; the thus exhausting vapor with its travel therebetween producing an increase in force which gives a powerful turning action on the rotor.

Further objects and advantages will become more apparent from a reading of the following specification taken in conjunction with the drawings, in which:

BRIEF DESCRIPTION OF THE DRAWINGS

FIG. 3 shows a top plan view taken partially in section of the principles of this invention applied to a reciprocating engine;

FIG. 4 is a sectional view on line 4—4 of FIG. 3;

DESCRIPTION OF THE EMBODIMENTS

Figure 1:
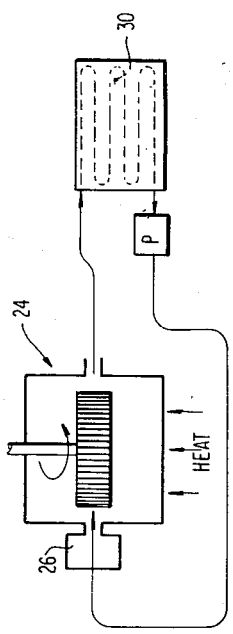
FIG. 1 is a flow chart schematically showing the principle of this invention as applied to a reciprocating piston-type engine.

In this application reference is made initially to FIG. 1 which schematically depicts in flow chart form the basic concept of this invention as applied to reciprocating type engines, as well as turbine engines, and is referred to for a more expedient understanding of the principles of the invention which is to be described in greater detail later herein.

A reciprocating type engine, as shown at 10, includes an expansion chamber 12, a piston 14 and a piston rod 16 connected thereto. The chamber 12 is provided with a fluid injector nozzle 18 and an exhaust port 20. For purposes of description throughout the application reference will be made to the "fluid" as being Freon 113 ($CCl_2F - CClF_2$). A complete circuit of the path of travel of the freon from its gaseous state to its liquid state is also depicted in FIG. 1. Assuming that fluid has been charged into the heated cylinder through the heated injector valve, it instantly vaporizes into a gas and expands to drive the piston. On exhaust stroke of the piston the gaseous vapors are charged through exit port 20 and if desired to be saved, are re-cycled to a condenser 30 where they are sublimated and then pumped again in another cycle to the injector valve for another stage of driving the piston 14. It is to be understood that it is not necessary for the expanded fluid which is exhausted from the reciprocating engine to be returned to a condenser for sublimation and then recirculated through a pump back to the injector valve for re-cycling again, but it could instead be exhausted to atmosphere.

It is to be understood that the system disclosed in the flow chart is arranged through suitable timing mechanism to charge cyclical pulses of a gaseous fluid into the heated injector valve where it is introduced into the expansion chamber of the heated motor and its volume is increased by expansion.

To those skilled in the art it will be apparent that any suitable heat source to heat the engine may be utilized, e.g. gas, electricity, petroleum, nuclear power, as well as solar power is also contemplated.

Figure 1A:
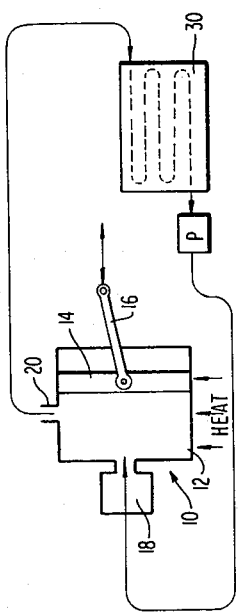
FIG. 1a is a flow chart schematically showing the principle of this invention as applied to a turbine-type engine.

Referring to the flow chart, FIG. 1a there is also shown a turbine engine 24 into which is charged through the injector valve 26 a predetermined quantity of vapor, the volume of which is instantly increased by expansion by the heat source applied to the turbine injector valve chamber therefor as well as the engine thereby driving the rotor to the turbine to achieve a source of energy output.

The foregoing explanation is believed to better familiarize the reader with several of the fields in which the inventive concept is considered to be applicable.

Figure 2:
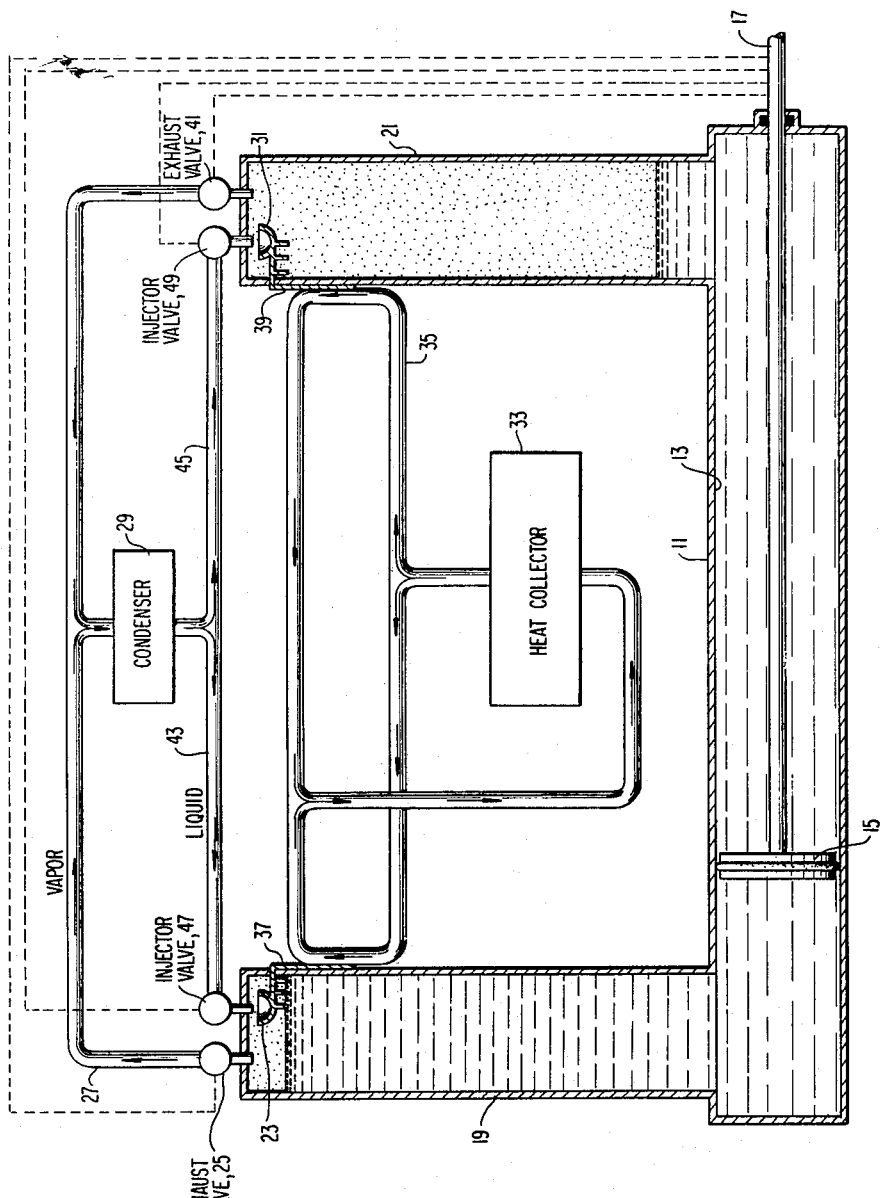
FIG. 2 shows partially in cross section and partially in elevation the application of the broad principle of this invention to a reciprocating-type engine and discloses a heat collector and evaporating condenser in the complete system.

In FIG. 2 there is shown a simplified form of a non-polluting engine, the construction principles and operation of which will now be described.

The cylinder 11 is properly machined to provide a symmetrical bore 13 with the piston 15 having a drive shaft 17 arranged to control a suitable valving mechanism for injection of fluid to the engine as well as exhaust valve means for discharging the spent gases, after completion of the power stroke, to atmosphere, all of which will become apparent later as the description progresses.

At the opposite ends of the cylinder 11 there are provided upstanding chambers 19 and 21, respectively, which may be columnar or of any desired configuration, their shape having no particular bearing on the operation of the machine, their purposes being merely to provide a source of supply for reciprocating the piston 15.

As explained hereinbefore with respect to the flow chart, this engine is designed to run on heat.

In the engine in FIG. 2, Freon —113 ($CCl_2F - CClF_2$) is utilized as the power transmitting fluid, i.e., as it sublimates into a gaseous vapor, it exerts its force on some other fluid or liquid, which may be water, for example. Although in this description Freon and water will be discussed as being the fluids involved, it is to be understood that other vapor-pressure fluids as well as other motive fluids may be used.

In the structure shown in FIG. 2, it will be assumed that the piston 15 has just completed one power stroke and is moving from right to left as viewed in the drawing. The top of the liquid has now attained the elevation shown in column 19 immediately beneath the baffle plate 23. The Freon which is vaporized by the plate is discharged through the exhaust valve 25 and into conduit 27 where it is fed into the condenser 29 from which it may be discharged into first one heated baffle plate 23 above one column or through another injector into the other heated baffle plate 31 positioned in the other column, thus providing for transmission of power by sublimation to the opposite faces of the piston.

In the device shown in FIG. 2, it is to be assumed that the collector 33 is of any suitable design such as a solar flat plate heat collector and includes together therewith a closed conduit system 35 which will transmit heat flow to the baffle plates 23 and 31, respectively, by means of the heat transfer elements 37 and 39.

In view of the foregoing, it is believed now to be clear that with all of the valving mechanism under control of the power shaft 17 and with suitable timing mechanism arranged to cooperate with the power shaft and the valving mechanism, that when the fluid Freon is introduced to the heated baffle 31 through the injector 49 whereupon it sublimates, the water which is also heated (as explained earlier) is driven down causing the piston 15 to move to the left thus pushing the water up column 19 and exhausting the Freon vapors out through the valve where they are evaporated in the condenser 29. And on a reverse cycle of the piston as it moves toward the right, the water climbs column 21 and the vapors are exhausted through the exhaust valve 41 and forwarded to the condenser for evaporation.

It is to be understood, of course, that the condenser 29 includes branch lines 43 and 45 which extend to the fluid injector valves 47 and 49, respectively, previously referred to, for proper feeding of the fluid to the point of evaporation, all of which, as explained, is under control of the power shaft and the timing mechanism.

Solar heat has been referred to as the energy source and by means of which heat is accumulated in the collector 33; however, it is also contemplated that other means for deriving heat could perform satisfactorily such as gas, electricity, petroleum or nuclear energy.

Turning now to the views in FIGS. 3 and 4, there is shown, respectively, in a top plan view a reciprocating type engine using an inline four cylinder piston-type engine provided with plural cam operated fluid injection valves and exhaust valves, it being understood that this drawing is not limitative, but merely one simple manner of showing the applicability of the concept of this invention to the block of a four cylinder engine.

The engine block head 30 (FIG. 3) is suitably bored and threaded as at 32, 33, 34 and 35 and adapted to receive in the threaded bores injector valve chambers 36, 37, 38 and 39, respectively, each of which includes a slidable cap 42 provided internally thereof with seal means 44 to prevent leakage between the injector chamber and the surrounding cap, with resilient means 40 interposed between the cap 42 and the injector valve 46. The injector valve is arranged to be opened under pressure of the cam 48 and the timing cycle of these valves and sequential operation of the valve cams are all correlated together with operation of the exhaust valve cam mechanism to provide a properly functioning engine, as will be understood by those skilled in the art.

The fluid, as explained earlier herein, is pumped from the condenser into each injector chamber, the valves (FIG. 3) being normally maintained in a closed condition and opened under the force of the cams (cam 48, only one shown in FIG. 4). It will be understood that each injector valve is always filled with fluid and prepared for the next injection of fluid to the heat chamber by reason of the pulsing action of the cams which operate the injection valves. As the injector valve is opened, a pulse of gaseous vapor is charged into the annular chamber 50 and into contact with the heat convector 52 which includes longitudinally extending fins 54 in its upper and lower surfaces, the arrangement being such that the heat source which traverses the base length of the longitudinal passageway in which each convector 52 is positioned will be properly heated.

In view of the foregoing, it will now be understood that by reason of the fluid undergoing sublimation, the gaseous vapors from the injection chambers that are charged into the convector 52 will instantly expand and travel laterally through the expansion chamber 56 and into the cylinder 58 above the piston 60 in order to perform the work.

As shown in cross section in FIG. 4, the cylinder head is apertured above the piston, as explained earlier, and provided with a reciprocable exhaust valve 62 which extends through the port 64, the stem 65 of the valve being spring loaded as at 66 and driven by the overhead cam 68.

As narrated, with reference to the flow chart shown in FIG. 1, it is believed that the operation of the reciprocating engine will be understood from the following description which will relate strictly to one injector and cylinder bank.

Fluid under pressure is applied to an injector chamber where it is partially gasified and awaits the rotation of the cam which at the proper time when the piston is substantially at the top of its travel in the cylinder, actuates the injection valve to inject the spray into the expansion chamber and onto the heated fins of the convector 52. The partially gasified fluid undergoes complete sublimation, traverses the expansion chamber and enters directly into the cylinder chamber above the piston which is at the top of its stroke. During this operation it will be understood that the exhaust valve is normally closed. The injection cycle is of sufficient duration to charge into the convector the proper amount of Freon for filling the piston chamber to full capacity to drive the piston downwardly and then the supply of Freon is cut off. When the piston 60 reaches the bottom of its stroke, the exhaust valve 62 is again opened by its cam mechanism. The rotation of the crank shaft 70 now forces the piston upward while the exhaust valve is open causing the expanded fluid to be exhausted. Thus, there is provided a reciprocating motion with a downward power stroke and an upward exhaust stroke of the piston. As best shown in FIG. 4, the injector valve is merely a means by which a small quantity of Freon is charged into the heated expansion chamber. It will be understood from the drawing of FIG. 3 that the engine described is provided with four cylinders and that the timing thereof is such that by proper functioning one piston after another is arranged to deliver power to the crankshaft.

As described earlier in connection with FIG. 1, a condenser and pump system is an optional arrangement and is so arranged that the products exhausted from the piston chambers are combined and transferred to a condenser where they are evaporated and then forwarded to a pump to drive the fluid through another cycle of operation. Numerous arrangements of injection valves can be utilized and the type shown is only illustrative of one that will assure that fluid is injected under pessure into the convector of the heated expansion chamber.

It should be noted that the heat source is applied after the fluid is injected into the expansion chamber. The heat source may be applied directly to the cylinder wall within which the piston operates or in the alternative, as shown in the drawings to an open chamber which leads into the cylinder would also provide the same effect. This expansion chamber should be restricted in overall area because the volume of expanded gases that remain in it do not do any work.

Figure 5:
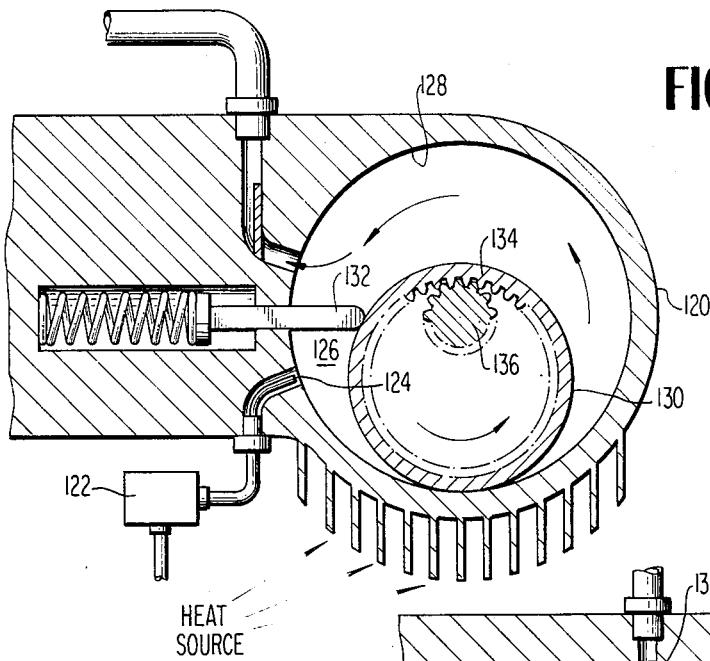
FIG. 5 is a generally cross-sectional view of one stage of the rotary engine including an eccentrically disposed rotary piston.

A further embodiment of this invention as applied to rotary engines is illustrated in a series of operational steps beginning with the view of FIG. 5. As explained earlier with regard to the other embodiments of this invention, heat is applied to the engine housing 120 and at the same time fluid under pressure is emitted by the injector valve 122 and through nozzle 124 into the heated chamber 126, the latter being formed by the cylinder wall 128, the rotary member 130 and the spring-urged reciprocable blade 132, whereupon it is instantly sublimated. As a natural consequence, the expansion of the fluid into gaseous vapors will begin to drive the rotary member 130 which is keyed by the teeth 134 to the drive shaft 136 and cause it to rotate in the direction of the arrow.

Figure 6:
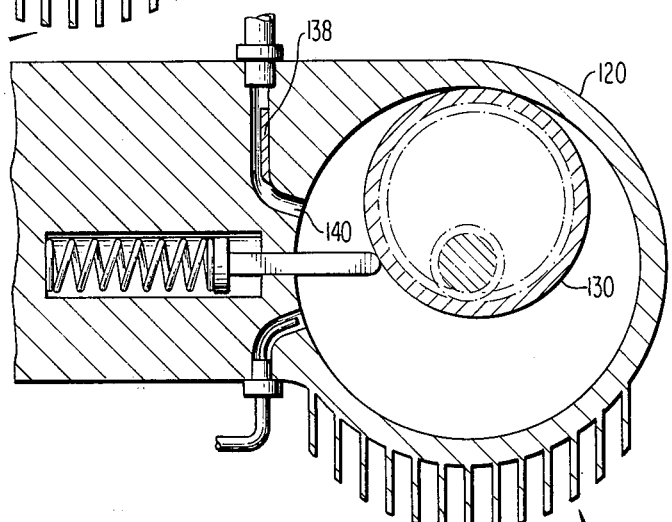
FIG. 6 shows in cross section another stage of this same type of engine.

In FIG. 6 the rotary member is now shown as having moved in a counterclockwise direction toward the exhaust port along the surface of the cylinder wall 128 driving before it the gaseous vapors that have been expanded in the previous power stroke causing them to be discharged past the valve 138 and out the exhaust port 140 to atmosphere.

It is contemplated that a flywheel will be secured to the shaft 136 and suitable timing mechanism will be used to produce a continuous rotation of the rotary member under the influence of the cyclic pulses of fluid injected into the housing 120.

Figure 7:
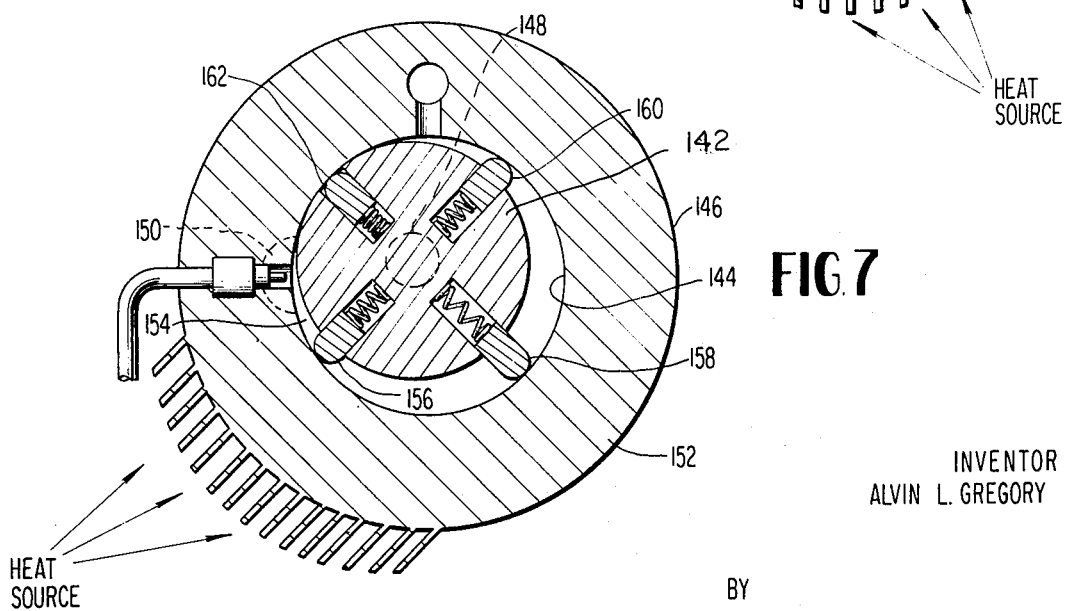
FIG. 7 shows a cross-sectional view of still another type of rotary engine with slidable vanes.

In another embodiment of this invention as illustrated in FIG. 7, there is disclosed still another type of rotary engine in which the rotary member 142 is eccentrically disposed relative to the cylinder wall 144 of housing 146 and associated with a drive shaft 148.

In this type of vane-operated rotary engine, fluid is injected into the intake port from the injector valve with the wall of the housing 152 being heated, and the gaseous vapors thus formed are expanded and emitted into the area 154 ahead of vane 156 and instantaneously drive the rotor 142 in a counterclockwise direction. As the blade 156 moves in a counterclockwise direction under the force of the expanding vapors, blade 160 by wiping across the cylinder wall 144 is causing discharge ahead of its travel of earlier expanded and now spent vapors. Those skilled in this art will understand that there is an expansion charge also confined between the trailing edge of blade 160 and the leading edge of blade 158.

In this embodiment of the rotary engine it is also contemplated that a flywheel will be associated with the drive shaft 148 to provide for smooth operation of the engine and that suitable timing mechanism will be adapted to provide cyclical pulses of fluid to the intake port 150 for proper operation of the engine.

That which is claimed is:

1. A prime source of mechanical power comprising an expansion chamber having three portions situated laterally adjacent one another with the second portion having a volume less than that of the first portion and less than that of the third portion and with the second portion being situated between the first portion and the third portion so as to open into the third portion and provide an unobstructed path between the first portion and the third portion, wherein:
   a. said first portion includes heat transfer fins which extend into the volume defined by said first portion, said heat transfer fins receiving the heat applied to said first portion by an external heat source;
   b. said first portion has an inlet through which an expansible fluid is injected into the volume defined by said first portion and into contact with said heat transfer fins for expansion and ultimate displacement through said second portion and into said third portion; and c. said third portion includes energy converting means which is displaced by the expanding fluid entering said third portion, and an exhaust outlet through which the fluid is exhausted after expansion has been completed.

2. A prime source of mechanical power as claimed in claim 1, wherein the means for converting the energy of said fluid into useful mechanical motion is a reciprocable piston.

3. A prime source of mechanical power as claimed in claim 1, wherein the inlet to said first portion of said expansion chamber comprises an injector valve.

4. A prime source of mechanical power as claimed in claim 3, wherein the fluid is partially gasified in said injector valve prior to entry into said first portion of said expansion chamber.

5. A prime source of mechanical power as claimed in claim 1, wherein the external heat source is solar energy.

6. A prime source of mechanical power as claimed in claim 1, wherein the heat source is gaseous.

7. A prime source of mechanical power as claimed in claim 1, wherein the external heat source is nuclear energy.

8. A prime source of mechanical power as claimed in claim 1, wherein the external heat source is electrical energy.

9. A prime source of mechanical power as claimed in claim 1, wherein the external heat source is energy derived from hydrocarbons.

* * * * *